US008499977B2

(12) United States Patent
Hughes

(10) Patent No.: US 8,499,977 B2

(45) Date of Patent: Aug. 6, 2013

(54) PLUNGER

(75) Inventor: Graham Hughes, Berkshire (GB)

(73) Assignee: P. C. Cox Limited, Berkshire (GB)

( * ) Notice: Subject to any disclaimer, the term of this patent is extended or adjusted under 35 U.S.C. 154(b) by 246 days.

(21) Appl. No.: 12/910,462

(22) Filed: Oct. 22, 2010

(65) Prior Publication Data

US 2011/0095054 A1 Apr. 28, 2011

(30) Foreign Application Priority Data

Oct. 22, 2009 (GB) .................................. 0918585.1

(51) Int. Cl.

| | |
|---|---|
| ***B67D 7/70*** | (2010.01) |
| ***B67D 7/74*** | (2010.01) |
| ***B67D 7/60*** | (2010.01) |
| ***G01F 11/00*** | (2006.01) |

(52) U.S. Cl.

USPC ............ 222/137; 222/391; 222/135; 222/129

(58) Field of Classification Search

USPC .............. 222/326, 327, 137, 145.5, 132, 145; 604/15, 311

See application file for complete search history.

(56) References Cited

U.S. PATENT DOCUMENTS

| | | | |
|---|---|---|---|
| 2,388,662 A | 11/1945 | Anderson et al. | |
| 2,582,156 A * | 1/1952 | Peterson | 222/327 |
| 2,692,706 A | 10/1954 | Wiksten | |
| 2,705,463 A * | 4/1955 | Moore | 425/131.1 |
| 2,839,945 A | 6/1958 | Benson | |
| 2,840,276 A | 6/1958 | Dreyer, Jr. et al. | |
| 3,254,806 A | 6/1966 | Madsen | |
| 3,353,537 A | 11/1967 | Knox et al. | |
| 3,431,953 A | 3/1969 | Rutherford | |
| 3,559,687 A | 2/1971 | Aslan | |
| 3,740,612 A | 6/1973 | Gauthier et al. | |
| 3,768,472 A | 10/1973 | Hodosh et al. | |
| 3,780,384 A | 12/1973 | Rivelle | |
| 3,819,115 A | 6/1974 | Soderman | |
| 3,980,209 A | 9/1976 | Collar | |

(Continued)

FOREIGN PATENT DOCUMENTS

| | | |
|---|---|---|
| CH | 329 614 | 4/1958 |
| DE | 1784336 | 8/1971 |

(Continued)

OTHER PUBLICATIONS

Cox Sealant Applicators, Jun. 17, 2008, www.toolbarn.com/product/CCM-380-10/.*

(Continued)

*Primary Examiner* — Paul R Durand
*Assistant Examiner* — Benjamin R Shaw
(74) *Attorney, Agent, or Firm* — Patterson Thuente Pedersen, P.A.

(57) ABSTRACT

A plunger for a dispenser for cartridges containing materials to be dispensed, for example viscous materials, is disclosed, the plunger having three plunger portions which define empty spaces therebetween so that cartridges, for example two-component concentric cartridges, of a plurality of dimensions and configurations can operatively mate with the plunger. A dispenser having a plunger as described can be used with a multitude of different cartridge types, including concentric two component cartridges or cylindrical single component cartridges, of varying overall dimensions and configurations. Also disclosed is a plunger for assisting the alignment of a cartridge in the dispenser. Corresponding dispensers and methods of loading cartridges are further disclosed.

16 Claims, 6 Drawing Sheets

(56) References Cited

U.S. PATENT DOCUMENTS

| | | | | |
|---|---|---|---|---|
| 4,029,236 | A | 6/1977 | Carson, Jr. et al. | |
| 4,116,364 | A | 9/1978 | Culbertson et al. | |
| 4,171,072 | A | 10/1979 | Davis, Jr. | |
| 4,174,068 | A | 11/1979 | Rudolph | |
| 4,264,021 | A | 4/1981 | Davis, Jr. | |
| 4,273,269 | A | 6/1981 | Davis, Jr. | |
| 4,290,091 | A | 9/1981 | Malcolm | |
| 4,322,022 | A | 3/1982 | Bergman | |
| 4,366,919 | A * | 1/1983 | Anderson | 222/137 |
| 4,376,498 | A | 3/1983 | Davis, Jr. | |
| 4,472,141 | A | 9/1984 | Dragan | |
| 4,757,628 | A | 7/1988 | Bulfer | |
| 5,125,836 | A | 6/1992 | Dragan et al. | |
| 5,127,552 | A | 7/1992 | Bauman et al. | |
| D329,277 | S | 9/1992 | Keske et al. | |
| 5,163,584 | A | 11/1992 | Huber et al. | |
| 5,277,099 | A | 1/1994 | Powers | |
| 5,301,842 | A | 4/1994 | Ritter | |
| 5,370,282 | A | 12/1994 | Sedlmeier | |
| 5,489,207 | A | 2/1996 | Dragan et al. | |
| 5,558,277 | A | 9/1996 | Owen et al. | |
| D394,994 | S | 6/1998 | Dreve | |
| 5,860,739 | A | 1/1999 | Cannon | |
| D411,421 | S | 6/1999 | Mayeur | |
| 6,116,902 | A | 9/2000 | Schoedel et al. | |
| 6,135,328 | A | 10/2000 | Schneider et al. | |
| 6,401,988 | B1 * | 6/2002 | Parent et al. | 222/326 |
| 6,412,667 | B1 | 7/2002 | Huang | |
| 6,454,138 | B1 * | 9/2002 | Greenhill et al. | 222/391 |
| D479,305 | S | 9/2003 | Zittel et al. | |
| 6,681,957 | B1 * | 1/2004 | Green | 222/135 |
| 6,929,157 | B2 | 8/2005 | Orecchia et al. | |
| 7,334,709 | B1 | 2/2008 | Huang | |
| D583,639 | S | 12/2008 | Axinte et al. | |
| D588,231 | S | 3/2009 | Pellin et al. | |
| 7,632,251 | B2 | 12/2009 | Lin et al. | |
| D608,858 | S | 1/2010 | Baltz et al. | |
| D649,221 | S | 11/2011 | Sinders et al. | |
| D660,105 | S | 5/2012 | Brummitt | |
| D660,663 | S | 5/2012 | Brummitt | |
| 2002/0092871 | A1 | 7/2002 | Rickard et al. | |
| 2004/0216591 | A1 | 11/2004 | Assadi et al. | |
| 2004/0216733 | A1 | 11/2004 | Siegel et al. | |
| 2007/0102457 | A1 | 5/2007 | Campbell et al. | |
| 2008/0149216 | A1 * | 6/2008 | Speck | 141/3 |
| 2012/0160877 | A1 | 6/2012 | Brummitt | |

FOREIGN PATENT DOCUMENTS

| | | | |
|---|---|---|---|
| DE | 3031939 | | 8/1980 |
| DE | 3420324 | A1 | 12/1985 |
| DE | 9000957 | | 4/1990 |
| DE | 9011965 | | 10/1990 |
| DE | 102005038621 | | 3/2007 |
| EP | 0276665 | | 8/1988 |
| EP | 0406113 | | 1/1991 |
| EP | 0443611 | | 3/1991 |
| EP | 0 436 155 | A2 | 7/1991 |
| EP | 0448375 | | 9/1991 |
| EP | 0525562 | | 2/1993 |
| EP | 0551998 | | 7/1993 |
| FR | 984352 | | 7/1951 |
| GB | 793277 | A | 4/1958 |
| GB | 1555455 | | 11/1979 |
| GB | 1589381 | | 5/1981 |
| GB | 2 276 365 | A | 9/1994 |
| GB | 2276365 | A * | 9/1994 |
| NL | 6 602 366 | | 8/1966 |
| WO | WO 2005/095225 | A1 | 10/2005 |
| WO | WO2006/106215 | | 10/2006 |
| WO | WO2011/052891 | | 5/2011 |

OTHER PUBLICATIONS

GB Search Report dated May 11, 2010, 4 pages.

Web page printout, "Universal Coaxial Adhesive Dispenser", http://www.5mix.com/Universal%20Dispenser.htm, printed Jun. 24, 2009, 2 pages.

European Search Report for European Application No. 10196812.1 dated Mar. 9, 2012.

European Search Report for European Application No. EP91102643 dated Oct. 3, 1991.

European Search Report for European Application No. EP90401861 dated Mar. 13, 1991.

European Extended Search Report for European Application No. 10196812.1 dated Jul. 11, 2011.

European Extended Search Report of European Application No. 10196810.5 dated Jul. 19, 2011.

European Extended Search Report of European Application No. 10196813.9 dated Jun. 28, 2011.

European Extended Search Report of European Application No. 10196816.2 dated Jun. 22, 2011.

International Search Report of International Application No. PCT/FR2006/000710 dated Jul. 13, 2006.

Application and File History for U.S. Appl. No. 13/336,462, filed Dec. 23, 2011, inventor Brummitt.

Application and File History for U.S. Appl. No. 13/336,480, filed Dec. 23, 2011, inventor Brummitt.

Application and File History for U.S. Appl. No. 13/336,517, filed Dec. 23, 2011, inventor Brummitt.

Application and File History for U.S. Appl. No. 12/978,695, filed Dec. 27, 2010, inventor Burmmitt.

Web page printout, "Complet Applicator Super Strong Single-dose applicator", Dec. 20, 2010. http://www.sdi.com.au/en.complet-applicator/.

Web page printout, "Complet Applicator (SDI) Interguide Dental and Medical Supply", Dec. 20, 2010. http://interguidedental.com/Complet-Applicator-SDI-p13579.html.

* cited by examiner

PLUNGER

RELATED APPLICATION

The present application claims priority to GB Application No. 0918585.1 filed Oct. 22, 2009, which is incorporated herein in its entirety by reference.

TECHNICAL FIELD

The present invention relates to a plunger for engaging a cartridge in a dispenser to dispense one or more materials from the cartridge, in particular although not exclusively, for engaging two-component cartridges having concentric compartments for containing the component materials to be dispensed.

BACKGROUND ART

A concentric two-component cartridge and a corresponding dispenser with concentric plungers arranged to engage corresponding concentric pistons on the cartridge is disclosed in U.S. Pat. No. 4,366,919. U.S. Pat. No. 6,454,138 discloses a similar dispenser for concentric two-component cartridges, which is reconfigurable to fit different cartridges. By removing or reconfiguring an inner one of two concentric plunger portions, component cartridges of different component ratios, or in other words different inner compartment diameters, can be used with the same dispenser. By removing an outer one of the concentric plunger portions, the dispenser can be used with single component cartridges.

WO-A-2005/095225 discloses a plunger having two plunger portions arranged to engage a respective piston of either a 10:1 or 1:1 two-component cartridge (or of a corresponding single component cartridge) without the need for reconfiguring the plunger. The plunger has an inner plunger portion which has a face smaller than a corresponding inner piston of the 1:1 cartridge and an outer plunger portion which has an annular face smaller than a corresponding outer piston of the 10:1 cartridge. Both plunger portions engage the piston of the single component cartridge. Thus, the same plunger can be used with three different cartridges, all of the same outer diameter. It would be desirable for the plunger to be useable with a larger number of piston configurations and also with cartridges having different outer diameters.

SUMMARY OF THE INVENTION

In some embodiments, a plunger for being driveably engaged with a dispenser for dispensing one or more materials from a cartridge, for example a cartridge having two concentric chambers each containing a respective component material, is provided. The plunger includes a first plunger portion at least partially surrounded by a second plunger portion to define an empty space (or transverse, that is perpendicular to longitudinal axis at the plunger, gap between respective faces of the plunger portions) therebetween and a third plunger portion at least partially surrounding the second plunger portion to define an empty space therebetween. The chamber wall of a single component cartridge or the chamber walls of a two component cartridge can locate within either one or more of the empty space or transverse gap or around the third plunger portion allowing a dispenser having a plunger as described above to be used with a larger number of cartridges than in the prior art, as described in detail below. Moreover, depending on the configuration of the chambers of the cartridges, in some cartridges the piston of one of the chambers will be engaged by two (or even three in the case of a single component cartridge) plunger portions, thereby achieving a better load distribution on the piston in question.

An outer one of the plunger portions may extend forward (that is a face for engaging the cartridge of the one plunger portion projecting beyond the remaining plunger portion or portions) of the remaining plunger portion or portions, providing a means for aligning cartridges having an outer diameter fitting within the outer plunger portion. The plunger portions may be concentric and, more particularly, the second and third plunger portions may fully surround the first plunger portion and, for example, may have an annular face for engaging a respective piston of the cartridge. The first plunger portion may have a corresponding disc shaped face. For the avoidance of doubt, the term “tranverse gap” refers to the gap relevant for accepting cartridges, that is the transverse (in some embodiments radial) component of the gap between faces, irrespective of whether the faces are longitudinally offset or not.

The plunger may include a push rod for engaging with a drive mechanism of the dispenser and the first plunger portion may include a face of the push rod. The second and third plunger portions may each be carried by respective carrier members which are secured to the push rod so that the first, second and third plunger portions advance together. The carrier members may be secured to the push rod at one end thereof by a cross-member.

The plunger portions may be dimensioned to be relatively thin to provide relatively wide empty spaces therebetween, as compared to other known arrangements where the empty spaces provide a clearance or a near clearance fit for the cylindrical walls of a particular cartridge. Thereby, cartridges having cylindrical walls with varying thicknesses and diameters can be used with the plunger. The plunger may be arranged to fit a number of commercially available cartridges, for examples any of the cartridges of the following group of industry standard cartridges: 150 ml, 300 ml and 330 ml 10:1 concentric cartridges, 380 ml 1:1, 2:1, 3.5:1, 4:1, 5:1 and 10:1 concentric cartridges and a 300 ml or 400 ml single component cartridge.

In further embodiments, a dispenser for dispensing one or more materials from a cartridge, including a plunger as described above for applying a dispensing pressure to the cartridge is provided. Also provided are plungers and dispensers with means for aligning cartridges which fit within an outer plunger portion and a corresponding method of loading a cartridge into a dispenser.

Specifically, in some embodiments there is provided a dispenser including a holder for holding a neck of a cartridge containing one or more viscuous materials and a plunger drivable relative to the holder along an axis to dispense the one or more materials from the cartridge, the plunger comprising means for aligning the cartridge with the axis cooperatively with the holder. The means for aligning may include a plunger portion for at least partially surrounding the cartridge. The said plunger portion may extend longitudinally forward of other plunger portions of the plunger.

In some embodiments, there is provided a method of loading a cartridge into a dispenser, the cartridge having a neck portion at a dispensing end thereof and an opposed open end for accepting a piston, the dispenser including a cradle for accepting the cartridge, the cradle having a holder at one end for engaging the neck portion of the cartridge; the dispenser further including a drive mechanism at another end of the cradle for driving a plunger along the cradle; the method including locating the open end of the cartridge inside a portion of the plunger and allowing the neck portion of the cartridge to drop into the holder.

An embodiment of the invention is now described by way of example to further the understanding of the invention with reference to the accompanying drawings.

DETAILED DESCRIPTION

Figure 1:
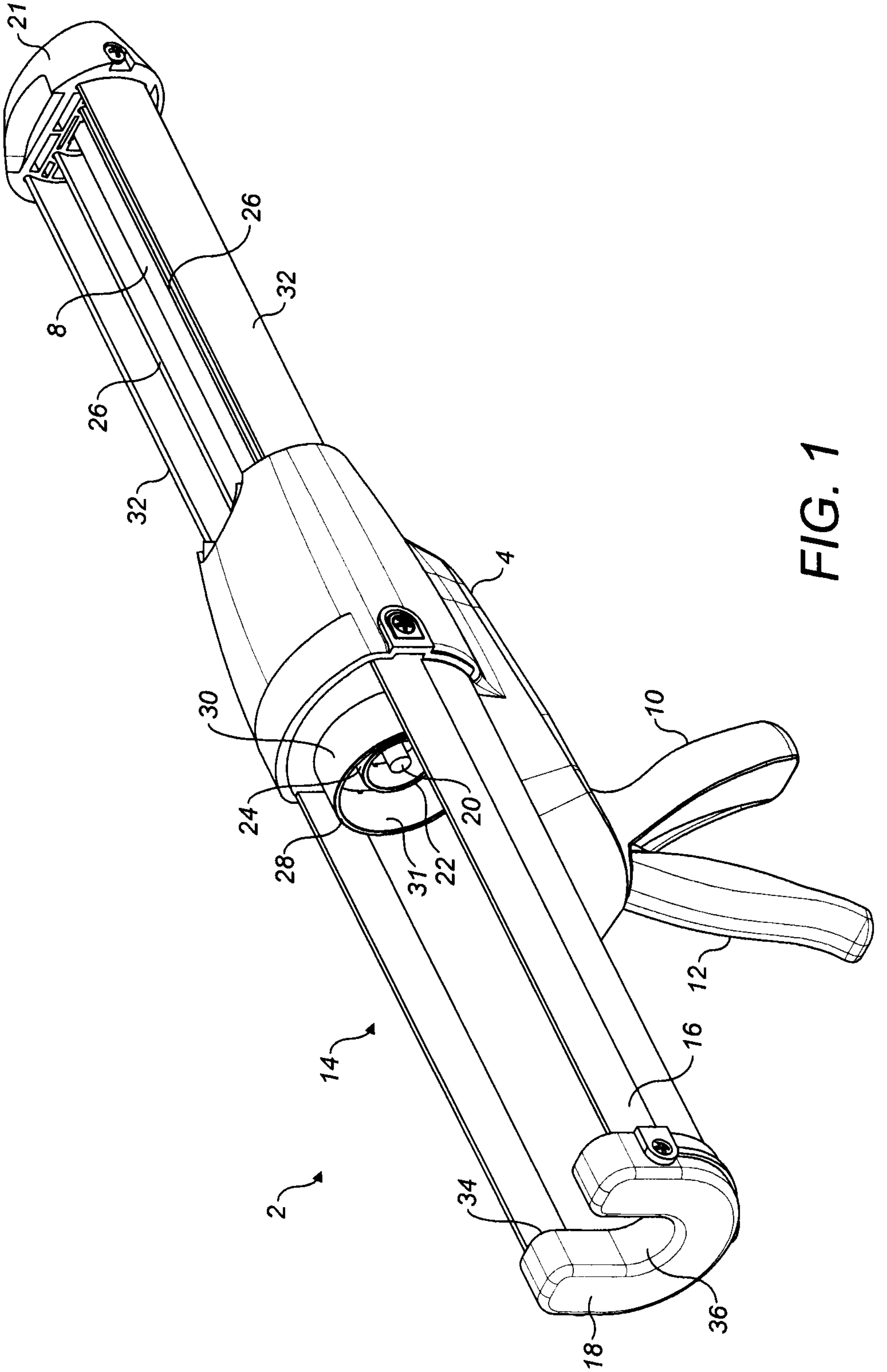
FIG. 1 is a perspective view of a dispenser including a plunger having three concentric plunger portions.
Figure 2:
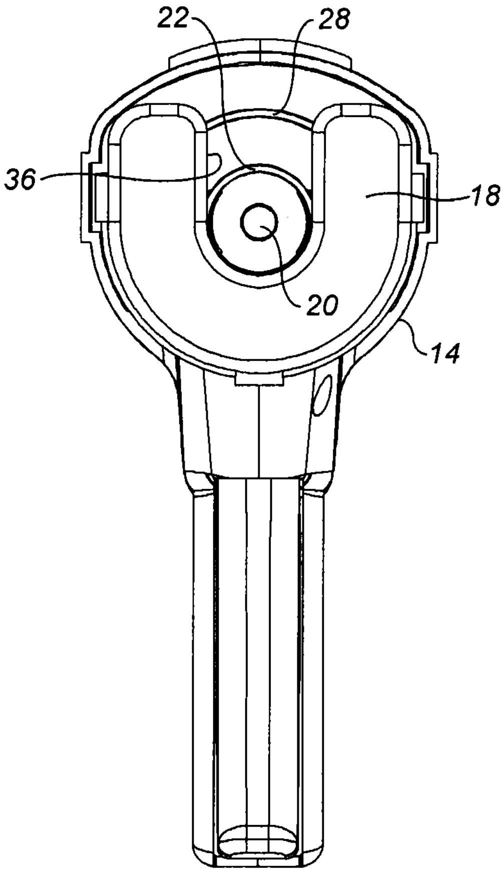
FIG. 2 is a front elevation of the dispenser in FIG. 1.
Figure 3:
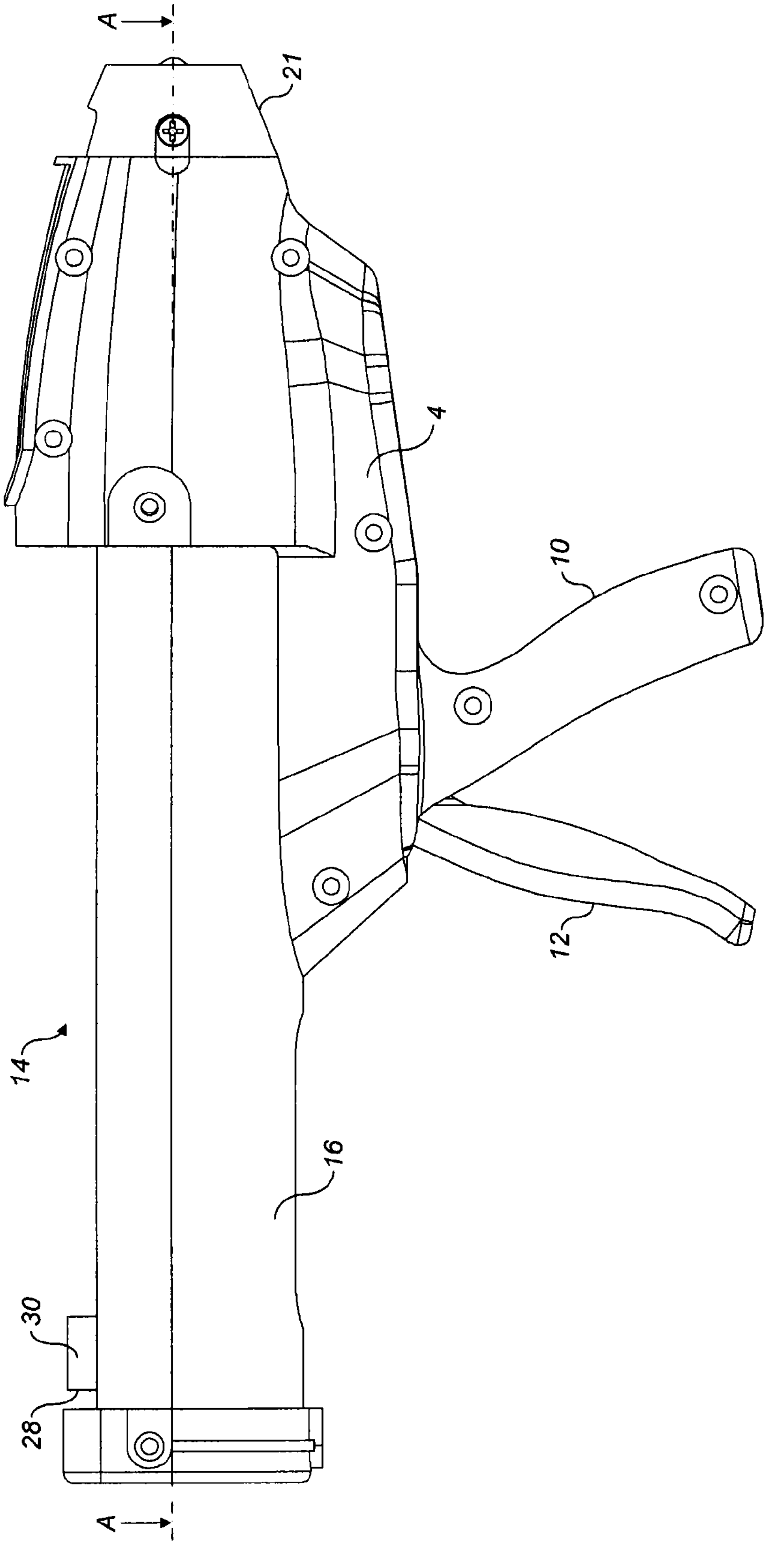
FIG. 3 is a side elevation of the dispenser in FIG. 2.
Figure 4:
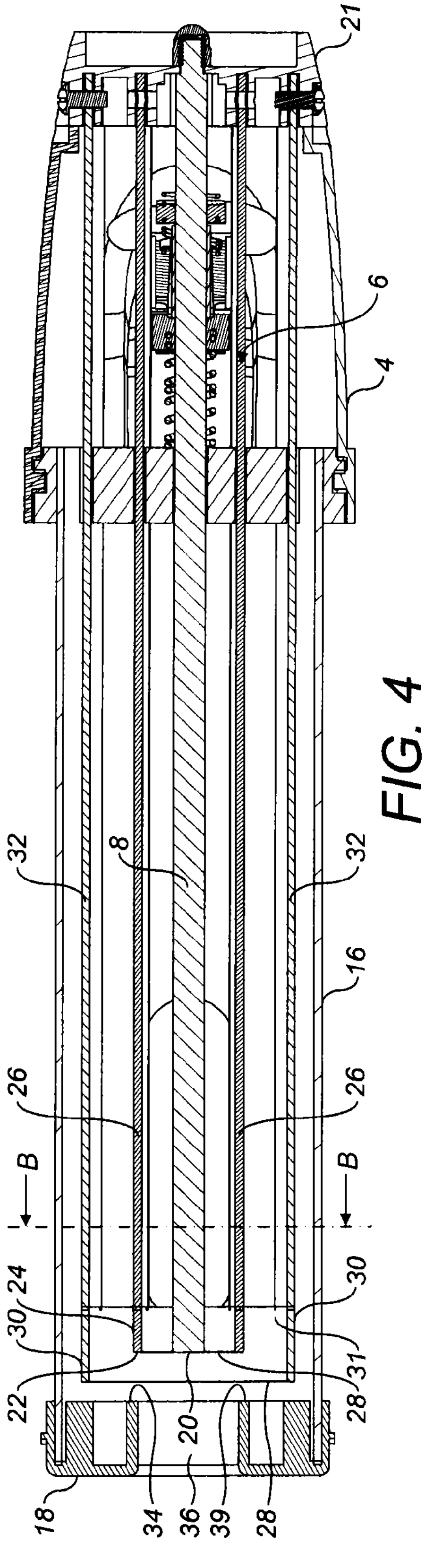
FIG. 4 is a cross-sectional view of the dispenser in FIG. 1 along the cross-section A-A indicated in FIG. 3.
Figure 5:
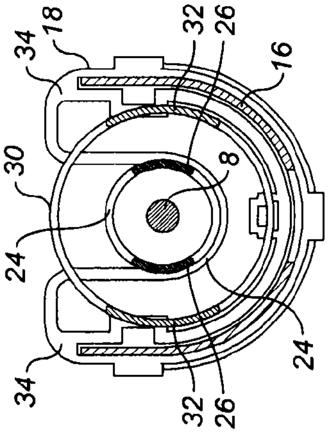
FIG. 5 is a cross-sectional view of the dispenser in FIG. 1 along the section B-B indicated in FIG. 4.

With reference to FIGS. 1 to 5, a dispenser 2 comprises a body portion 4 housing a drive mechanism 6 for driving a push rod 8. The body portion 4 has a handle 10 and a trigger lever 12 coupled to the drive mechanism 6. A holder 14 is secured to the body portion 4 and comprises a cradle 16 secured to the body portion 4 adjacent the drive mechanism 6 at one end thereof and having a slotted cap 18 secured to it at another end.

The push rod 8 defines, at an end facing the slotted cap 18, a face 20 and has a cross member 21 secured to it at an opposed end, defining a longitudinal axis between the face 20 and the cross member 21. The push rod face 20 is coaxially arranged with a corresponding annular face 22 of a cylindrical member 24 carried by corresponding carrier members 26 extending through the body portion 4 in parallel to the push rod 8 and being secured to the cross member 21. The annular face 22 is flush with the push rod face 20 in a longitudinal direction. The annular face 22 is in turn surrounded by a further annular face 28 of a further cylindrical member 30 carried on further carrier members 32. The further carrier members 32 extend parallel to push rod 8 and carrier members 26 through the body portion 4 and are secured to the cross member 22 to move in concert with the push rod 8 and carrier members 26 upon actuation of the drive mechanism 6. The further annular face 28 is, in a longitudinal direction, forward of the annular face 22 and push rod face 20.

The push rod face 20 has a diameter of 8 mm corresponding to the diameter of the push rod 8 and the annular faces 22 and 28 have a width of 2 mm corresponding to the thickness of the cylindrical members 24 and 30. The annular gap defined between the cylindrical member 24 and the push rod 8 has a radial width of 8.5 mm and the annular gap defined between the cylindrical member 24 and the further cylindrical member 30 has a radial width of 12 mm. Thus, the radial thickness of the cylindrical member 24 and further cylindrical members 30 is thus, respectively, about 4 and 6 times smaller than the radial width of the gap therebetween or the gap between the cylindrical member 24 and the push rod 8. As will become clear below, the relatively large gap to face ratio allows the annular faces 22, 28 to mate with a plurality of piston configurations of concentric two-component cartridges. The carrier members 26, 32 are of the same thickness as the corresponding respective cylindrical members 24, 30 and are arcuate with the radius of curvature corresponding to the respective cylindrical member 24, 30.

In use, a cartridge is placed in the cradle 16 with a front end of the cartridge against a shoulder 34 of the slotted cap 18 and a neck defining a dispensing end of the cartridge (for example connected to a suitable mixer nozzle) located in a slot 36 of the slotted cap 18. Advantageously, the cartridge's rear, piston end can first be located against the plunger (over or inside the further cylindrical member 30, depending on the outer diameter of the cartridge) and then the front end can be allowed to drop in to the cradle and locate against the shoulder 39, possibly after an initial advance of the plunger. Thus, due to its forward disposition, the further cylindrical member 30 (more specifically, the inner surface 31 of the further cylindrical member 30) can act to align, in particular, cartridges with smaller outer diameters. This allows a simple locate and drop insertion of the cartridge, as discussed above. Following insertion of the cartridge, the push rod, and hence the push rod face 20, annular face 22 and further annular face 28 are then advanced in a dispensing direction into the cartridge by actuation of the trigger lever 12 against the handle 10 to engage one or more pistons of the cartridge. The drive mechanism is arranged so that repeated actuation of the trigger mechanism progressively advances the push rod in the dispensing direction to apply a dispensing pressure to the cartridge thereby dispensing material from the dispensing end. As is well known to the person skilled in the art, the drive mechanism is arranged to releasably prevent the retreat of the push rod, the push rod being releaseable for disengagement from the cartridge by pulling in a direction opposed to the dispensing direction. Accordingly, the push rod 8, cylindrical members 24 and 30 and carrier members 26, 32 define an actuatable plunger having three plunger portions arranged to engage the piston(s) of a cartridge held in the holder 14 at their respective faces 20, 22 and 28.

As is now described with reference to FIG. 6A to 6D, the dimensions and respective spacing of the three plunger portions allows the dispenser 2 to be used with a multitude of two-component cartridge types having different configurations of the component containing chambers and respective pistons. Concentric two-component cartridges, shown schematically in a rear view in FIG. 6A to 6D, comprise an outer cylindrical wall 38 defining a chamber for containing a first material cooperatively with an interior cylindrical wall 40. The interior cylindrical wall 40 defines a second, cylindrical chamber inside it for containing a second material. Some cartridges comprise a further, innermost wall 42 and the second chamber is defined cooperatively by the interior wall 40 and the inner most wall 42 with an empty cavity inside the inner wall 42. The chambers are sealed by respective first and second pistons 44 and 46, engageable with the plunger portions, or more specifically the faces 20, 22 and 28.

Figure 6A:
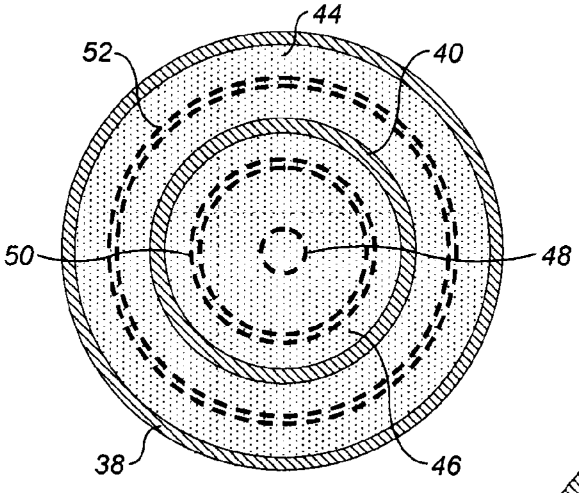
FIGS. 6*a* to 6*d* schematically illustrate respective contact areas the concentric plunger portions on various two component cartridges.
Figure 6B:
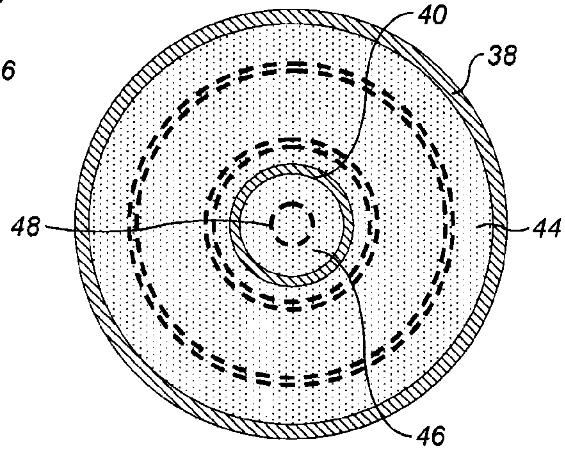
Figure 6C:
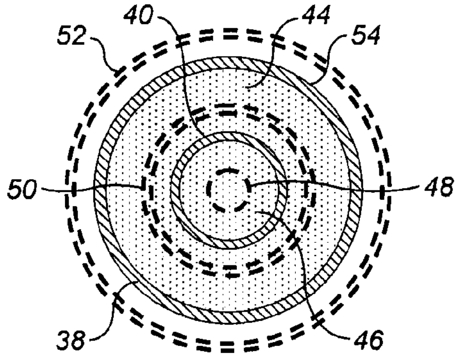
Figure 6D:
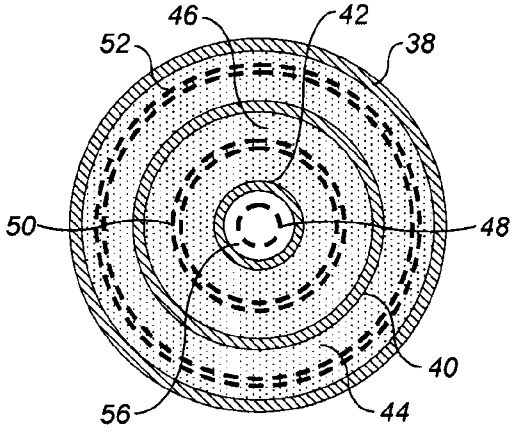

As is apparent from FIGS. 6*a* to 6*d*, the plunger described above is capable of mating with a plurality of different cartridge configurations. For example, with reference to FIG. 6A for one configuration, the faces 20 and 22 engage corresponding contact areas 48 and 50 on the (inner) piston 46 and the further annular face 28 engages a contact area 52 on the (outer) piston 44. In another example, for a cartridge having a larger dispensing ratio (dispensing volume or cross-sectional area of the outer chamber: dispensing volume or cross-sectional area of the inner chamber), the contact areas 52 and 50 are on the piston 44 and the contact area 48 is on the piston 46 (see FIG. 6*b*). Advantageously, the relatively larger of the two pistons is acted upon by two plunger portions in each case. With reference to FIG. 6*c*, for a cartridge having a smaller overall cross-section the contact area 48 is located on the piston 46 and the contact area 50 is located on the piston 44 with the (notional) contact area 52 not located on the cartridge at all but rather the further cylindrical member 30 locating slidingly around the outer surface 54 of the cartridge.

In yet a further example of a cartridge having a central cavity 56, the push rod 8 and push rod face 20 locate inside the cavity 56 as indicated by (notional) contact area 48 while the contact areas 50 and 52 locate, respectively, on the pistons 44 and 46 corresponding to the outer and inner chambers. This would also allow use of the plunger with three component cartridges, where the cavity 56 is filled with the third component and a corresponding piston.

Figure 7A:
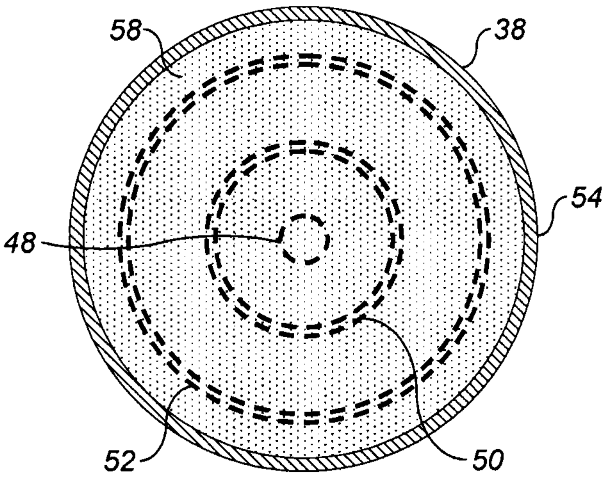
FIGS. 7*a* to 7*d* schematically illustrate respective contact areas of the three concentric plunger portions on a single component cartridge.
Figure 7B:
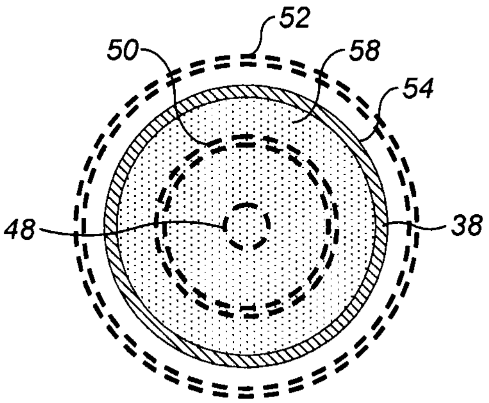
Figure 7C:
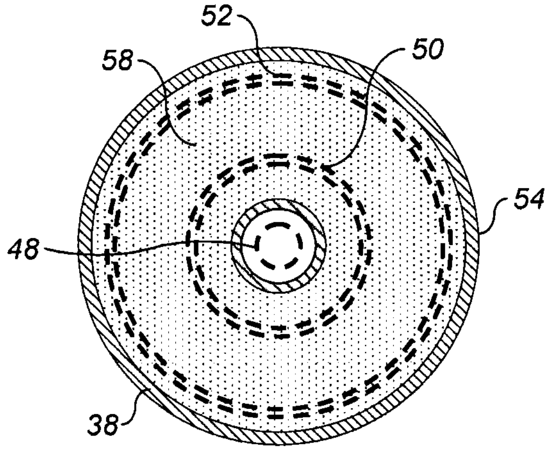
Figure 7D:
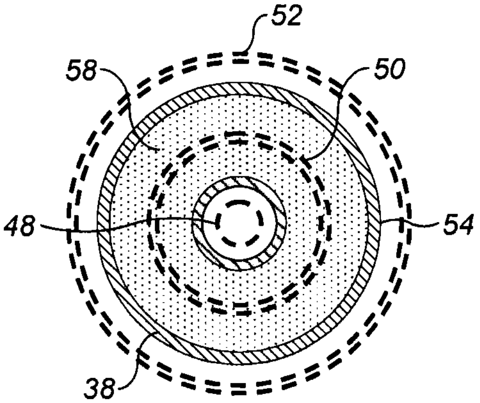

As illustrated in FIGS. 7*a* to 7*d*, the plunger is also useable with single component cartridges of varying diameters and configurations, having only a single piston 58. For example, all three plunger portions (faces 20, 22, 28) may locate on the single piston 58 (FIG. 7*a*), an outer and middle plunger portion (face 22 and 28) may located on the piston 58 with the inner push rod portion (face 20) locating within a central cavity (FIG. 7*c*), the outer plunger portion locating around the cartridge with the middle and inner plunger portions locating on the piston 58 (FIG. 7*b*) and only the middle plunger portion locating on the piston 58 with the outer plunger portion locating around the cartridge and the inner plunger portion locating in a central cavity (FIG. 7*b*).

As is apparent from the foregoing description, the plunger is capable of operatively engaging a plurality of different cartridge types having different dimensions and configurations by locating one, two or three plunger portions on a corresponding piston of the cartridge, with the cartridge walls being accepted in the empty spaces between the plunger portions (the transverse gaps between the respective faces) as the plunger advances into the cartridge to dispense material. For those cases where two (FIGS. 6*a*, FIG. 6*b*, FIG. 7*b*, FIG. 7*c*) or three (FIG. 7*a*) plunger portions engage the same piston, the pressure exerted on the piston material by each face (20, 22 or 28) of the plunger is reduced as the dispensing force is distributed among two or three plunger portions. In cases where one or more plunger portions locate around the cartridge or within a central cavity of the cartridge (FIG. 6*c*, FIG. 6*d*, FIG. 7*b*, FIG. 7*c* and FIG. 7*d*), the described arrangement of the plunger portions provides increased flexibility in the overall dimension or configuration of cartridges useable with the described plunger.

Specifically, the above-described plunger is arranged to accommodate industry standard 380 ml coaxial cartridges with 10:1, 3.5:1, 4:1 and 5:1, 2:1 and 1:1, respectively, dispensing ratios, 150 ml coaxial 10:1 cartridges, 300 and 330 ml coaxial 10:1 cartridges and a 300 ml or 400 ml single component cartridge. The 380 ml 10:1 cartridge has an outer diameter of 62-64 mm and an outer diameter of the interior wall 40 of 21-22 mm with the outer and middle plunger portion 22, 28 engaging on the outer piston and the inner plunger portion 20 engaging on the inner piston. The 380 ml 1:1 and 2:1 cartridges also have an outer diameter of 62-64 mm with an outer diameter of the interior wall 40 of around 73 mm and 36 mm, respectively, and the outer plunger portion 28 engages on the outer piston and the middle and inner plunger portion 22, 20 engage on the inner piston. For the 150 ml, 300 and 330 ml 10:1 cartridges, having an outer diameter of 49-51 mm and an outer diameter of the interior wall 40 of 17-18 mm, cartridge locates inside the outer plunger portion 28, thereby aligning it with the axis of the gun and allowing it to then be dropped into the slotted cap 18 as described above. The middle plunger portion 22 engages on the outer portion and the inner plunger portion 20 engages on the inner piston. The 150 ml 10:1 cartridge can also be used with a lurch, an adaptor making is suitable for use with single compound dispensers, in which case the outer and middle plunger portions 28, 22 locate on the lurch, with the inner plunger portion 20 locating inside a central cavity of the lurch. For the 300 ml or 400 ml standard cartridge, having an outer diameter of 50 mm, the cartridge similarly locates inside the outer plunger portion but the inner and middle plunger portions 20, 22 engage on the single piston.

Thus, in order to accommodate cartridges of varying dimensions and configurations, the total widths (sum of all widths) of the faces of the plunger portions is smaller than the total width of the transverse gaps between the faces. For an increased range of possibilities, in some embodiments the total widths of the faces of the plunger portions is smaller by a factor of between 2 to 12, preferably 4 to 6. It will be appreciated that, where the faces are not concentric or not annular, the relevant total widths of the faces is the sum of the respective widest width of each face and the relevant total width of the gaps is the sum of the respective narrowest width of each gap. Viewed differently, in terms of face area of the plunger portions, to accommodate cartridges of varying dimensions and configurations, the total face area of the plunger portions (sum of all face areas) is less than half of the area enclosed by the circumference of the (face of) the third plunger portion in some embodiments, preferably less than 40% or about 36% in one specific embodiment.

As will be appreciated by the person skilled in the art, many materials can be used in the manufacture of the dispenser 2, for example a sufficiently tough plastic such as ABS or nylon for the body 4, handle 10, trigger 12, slotted cap 36 and cross member 22 and a sheet metal for example steel, for the cradle 16, carrier member 32, 26 and cylindrical members 24 and 30 and a suitably hard steel for the push rod 8. Likewise, many different drive mechanisms 6 will be known to the person skilled in the art having either a direct or geared transmission of the force from the trigger lever 12 to the push rod 8, for example a catch plate mechanism as is well known in the art.

It will be understood that the above description of a specific embodiment is made for the purpose of illustration by way of example only and that many modifications, alterations and juxtapositions of the features described above will be apparent to the person skilled in the art, all of which are intended to be covered by the appended claims. In particular, the dimension and configurations of the plunger portions can be varied, for example the thickness and mutual distance of the cylindrical members and the respective distances from the push rod, the push rod's diameter, the shape of the push rod and the cylindrical members and the arrangement of the respective faces. For example, the push rod may have an additional end plate having a larger diameter than the push rod for engaging the cartridge. Likewise, the cylindrical members defining the middle and outer plunger portions need not fully surround the push rod or each other but one or both of the cylindrical members could be a part cylinder to only partially surround the push rod and/or other members. Other shapes, including any suitable curved or angled shape, are equally envisaged for these members, enabling engagement of non-conventionally shaped cartridges.

The invention claimed is:

1. A plunger for a dispenser for dispensing one or more materials from a cartridge, the plunger defining a longitudinal axis and including plunger portions each having a face configured to, in use, engage a piston of the cartridge to apply a dispensing pressure thereto, the plunger portions including a first plunger portion at least partially surrounded by a second plunger portion to define a transverse gap between the respective faces and a third plunger portion at least partially surrounding the second plunger portion to define a transverse gap between the respective faces, wherein the total face area of the faces of the plunger portions is less than half of the area enclosed by a circumference of the third plunger portion.

2. A plunger as claimed in claim 1, in which the plunger portions are configured to allow a cylindrical wall of the cartridge to be accommodated in each gap.

3. A plunger as claimed in claim 1, in which the third plunger portion extends longitudinally forward of the first and second plunger positions.

4. A plunger as claimed in claim 1, in which the plunger portions are concentric.

5. A plunger as claimed in claim 1, in which one or both of the second and third plunger portions fully surround the first plunger portion.

6. A plunger as claimed in claim 5 in which the faces of the second and third plunger portions are annular.

7. A plunger as claimed in claim 1, in which the total width of the faces of the plunger portions is smaller than the total width of the transverse gaps therebetween by a factor of between about 2 to 12.

8. A plunger as claimed in claim 1, in which the total face area of the faces of the three plunger portions is less than 40%.

9. A plunger as claimed in claim 1, in which the first plunger is contained within a radius of about 4 mm from a central longitudinal axis of the plunger, the second plunger portion is contained between a radius of about 12 mm, preferably 12.5 mm, from the central longitudinal axis of the plunger and a radius of about 15 mm, preferably 14.50 mm, from the central longitudinal axis of the plunger and the third plunger portion is contained between a radius of about 26 mm from the central longitudinal axis of the plunger and a radius of about 28 mm from the central longitudinal axis of the plunger.

10. A plunger as claimed in claim 1, arranged to fit an industry standard cartridge, wherein the industry standard cartridge is selected from of the group consisting of a 150 ml coaxial cartridge with a 10:1 dispensing ratio, a 300 ml coaxial cartridge with a 10:1 dispensing ratio, a 330 ml coaxial cartridge with a 10:1 dispensing ratio, a 380 ml coaxial cartridge with a 1:1 dispensing ratio, a 380 ml coaxial cartridge with a 2:1 dispensing ratio, a 380 ml coaxial cartridge with a 3.5:1 dispensing ratio, a 380 ml coaxial cartridge with a 4:1 dispensing ratio, a 380 ml coaxial cartridge with a 5:1 dispensing ratio, a 380 ml coaxial cartridge with a 10:1 dispensing ratio, a 300 ml single component cartridge, and a 400ml single component cartridge.

11. A plunger as claimed in claim 1, including a push rod for engaging with a drive mechanism of the dispenser.

12. A plunger as claimed in claim 11 in which the face of the first plunger portion includes a face of the push rod.

13. A plunger as claimed in claim 11, in which the second and third plunger portions are each carried by respective carrier members secured to the push rod.

14. A plunger as claimed in claim 13, in which the carrier members are secured to the push rod at an end opposite the plunger portions by a cross-member.

15. The plunger of claim 7, wherein the total width of the faces of the plunger portions is smaller than the total width of the transverse gaps therebetween by a factor of between about 4 to 6.

16. The plunger of claim 8, wherein the total face area of the faces of the three plunger portions is less than about 36%.

* * * * *